(12) United States Patent
Bhanuprasad et al.

(10) Patent No.: US 9,783,744 B2
(45) Date of Patent: Oct. 10, 2017

(54) PROCESS OF UPGRADATION OF RESIDUAL OIL FEEDSTOCK

(71) Applicant: Indian Oil Corporation Limited, Bandra (East), Mumbai (IN)

(72) Inventors: Sayapaneni Gopinath Bhanuprasad, Faridabad (IN); Sadhullah Mukthiyar, Faridabad (IN); Gadari Saidulu, Faridabad (IN); Ram Mohan Thakur, Faridabad (IN); Indranil Roy Choudhary, Faridabad (IN); Manoj Kumar Yadav, Faridabad (IN); Satheesh Vetterkunnel Kumaran, Faridabad (IN); Debasis Bhattacharyya, Faridabad (IN); Brijesh Kumar, Faridabad (IN); Biswapriya Das, Faridabad (IN)

(73) Assignee: INDIAN OIL CORPORATION LIMITED, Bandra (East) (IN)

( * ) Notice: Subject to any disclaimer, the term of this patent is extended or adjusted under 35 U.S.C. 154(b) by 0 days.

(21) Appl. No.: 15/240,191

(22) Filed: Aug. 18, 2016

(65) Prior Publication Data

US 2017/0130140 A1    May 11, 2017

(30) Foreign Application Priority Data

Nov. 7, 2015   (IN) ........................................ 4249/15

(51) Int. Cl.
*C10G 11/05*   (2006.01)

(52) U.S. Cl.
CPC ...... *C10G 11/05* (2013.01); *C10G 2300/1077* (2013.01); *C10G 2300/202* (2013.01); *C10G 2300/205* (2013.01); *C10G 2300/206* (2013.01); *C10G 2300/701* (2013.01)

(58) Field of Classification Search
CPC .............. C10G 11/05; C10G 2300/701; C10G 2300/205; C10G 2300/202; C10G 2300/1077; C10G 2300/206
See application file for complete search history.

(56) References Cited

U.S. PATENT DOCUMENTS

| 4,615,791 | A | 10/1986 | Choi et al. |
| 5,057,204 | A | 10/1991 | Yan |
| 6,193,875 | B1 * | 2/2001 | Pereira ..................... C10B 57/06 208/121 |
| 6,540,904 | B1 | 4/2003 | Gun et al. |
| 2009/0158657 | A1 * | 6/2009 | Hedrick ................. B01J 8/1836 48/76 |

* cited by examiner

*Primary Examiner* — Randy Boyer
*Assistant Examiner* — Juan Valencia
(74) *Attorney, Agent, or Firm* — Workman Nydegger

(57) ABSTRACT

Present invention relates to a novel process for upgrading a residual hydrocarbon oil feedstock having a significant amount of Conradson Carbon Residue (concarbon), metals, especially vanadium and nickel, asphaltenes, sulfur impurities and nitrogen to a lighter more valuable hydrocarbon products by reducing or minimizing coke formation and by injecting fine droplets of oil soluble organo-metallic compounds at multiple elevations of the riser with varying dosing rates.

10 Claims, 3 Drawing Sheets

*1.6 atm pressure & 3 wt% atomization steam*

*550°C & 1.6 atm*

*550°C & 3 wt% atomization steam*

PROCESS OF UPGRADATION OF RESIDUAL OIL FEEDSTOCK

FIELD OF THE INVENTION

The invention relates to a novel process for upgrading a residual heavy hydrocarbon oil feedstock having a significant amount of Conradson Carbon Residue (concarbon), metals, especially vanadium and nickel, asphaltenes, sulfur impurities and nitrogen to higher grade hydrocarbon oils.

BACKGROUND

Average API (American Petroleum Institute) gravity of conventional crude oil is decreasing due to presence of more residual content that boils above 550° C. and contains higher levels of asphaltenes, resins, concarbon and metal components. Use of high-boiling residue as heavy fuel oil or furnace oil is continuously decreasing due to stringent environmental regulations. This places greater emphasis on Refiners to process the entire barrel of crude oil to produce more valuable lower boiling products. Residue of high sulfur crude oil from vacuum distillation column bottom contains about 35-65% resins and asphaltenes, 20-30 wt % concarbon and 50-200 ppm metals. Concarbon & metals are mostly concentrated in the last 10% of crude oil. As vacuum residue contains larger amount of impurities, which are poisons to the catalyst, hence is not a preferred feedstock for catalytic cracking units. Various thermal cracking methods such as visbreaking, coking, etc. have been used to upgrade residue feedstock.

Under condition of thermal cracking, hydrocarbons when heated, long chain complex molecules crack into smaller hydrocarbon molecules. Asphaltene in the feed remain unaffected and additional asphaltenes may be formed via secondary polymerization reactions. Beyond certain temperature & residence time, asphaltenes stability get disturbed and precipitated due to cracking of resins and aromatic compounds. At this conversion, the product residue becomes unstable. Hence, visbreaking is conducted at mild operating conditions so that the stability of asphaltene is not disturbed. In visbreaking process, concarbon and metals are not removed from the visbroken product. As the product is typically used for producing fuel oil and demand for fuel oil is declining, the process is not widely used in the industry.

U.S. Pat. No. 6,540,904 discloses a process for upgradation of petroleum residue using Fe based catalyst along with almost 50% of water. However, the patent does not discuss the stability of the product.

U.S. Pat. No. 4,615,791 discloses a process for carrying out visbreaking operation at higher severity using hydrogen donor solvent for reducing the coke formation and producing a product of reduced viscosity, pour point and sedimentation characteristics.

U.S. Pat. No. 5,057,204 describes a process for increasing severity in visbreaking process using $SeO_2$ as a catalyst, which helps in promoting transfer of hydrogen from residue feed to the portion of the feed having reactive radicals formed during the reaction. This patent does not disclose the use of hydrogen and aromatic rich material, which helps in increasing visbreaking unit severity by enhancing solvency power of the hydrocarbon oil for keeping asphaltenes in dispersed phase.

U.S. Pat. No. 6,193,875 discloses a method for making an oil soluble coking process additive, including the steps like providing mixture of a metal salt in water wherein the metal salt contains a metal selected from the group consisting of alkali metals, alkaline earth metals and mixtures thereof; and the other step includes providing a heavy hydrocarbon and forming a emulsion so as to react a metal salt with components of the heavy hydrocarbon so as to provide a treated hydrocarbon containing oil soluble organometallic compounds.

Coking is very severe form of thermal cracking and converts the heaviest low value residue to valuable distillates and petroleum coke. Two types of coking processes most commonly & commercially practiced are delayed coking and fluidized bed coking. In delayed coking, the residue is heated in a furnace and passed to large drums maintained at temperatures from about 450-500° C. During the reaction, the colloidal suspension of the asphaltenes and resin compounds is distorted, resulting in precipitation of highly cross linked structure of amorphous coke. The compounds are also subjected to cleavage of the aliphatic groups. Polymerization and condensation of the free aromatic radicals and grouping of a large number of these compounds to such a degree that significant amount of coke is eventually formed along with some lighter gas and low boiling liquid products.

Conventional fluidized bed coking process units typically include a coking reactor and a burner. Residue feedstock is introduced into the coking reactor containing a fluidized bed of hot inert coke particles, and is distributed uniformly over the surfaces of the particles, where it is cracked into vapours and coke. A fraction of coke is burnt in burner to supply the endothermic heat required during coking process. The remaining coke is drawn off the burner vessel. Alternatively, in flexi-coking process, the coke is gasified with air & steam in a separate vessel.

Coking processes produces lower liquid yield & high amount of low value petroleum coke, typically 1.5 times of concarbon, which means, processing of heavy crude oil having 40% VR with 27% concarbon will produce 16 MT of coke as by product per every 100 MT of crude oil. The price of coke is very low as compared to crude oil price, approximately ¹/₁₀th of crude oil price and it erodes the refinery margin heavily. While residue can be upgraded in petroleum refineries via coking process, there is still a substantial need to have an efficient process for producing more liquid yield and to decrease the amount of gas and/or coke make, when upgrading such feedstocks.

SUMMARY

The present invention relates to a process of upgrading a residual hydrocarbon oil feedstock by reducing impurities using upgrading material, the process comprising:
  a) cracking the residual hydrocarbon oil feedstock along the length of a vertical transport Riser with an upgrading material, optionally adding ammonia or a basic nitrogen containing compound at the bottom of the vertical transport Riser;
  b) injecting oil soluble organo-metallic additives in the form of fine droplets at multiple locations in varying doses along the length of the Riser during the cracking of step (a);
  c) separating the cracked products and spent upgrading material in a Stripper and partially regenerating coke of the spent upgrading material so obtained in a Reformer;
  d) burning partially rejuvenated upgrading material from the Reformer in a Combustor; and
  e) circulating regenerated upgrading material from the Combustor to the Riser.

The present invention further relates to injecting oil-soluble organo-metallic additives at multiple locations in varying doses along the length of the Riser wherein the doses of the organo-metallic additives is maintained maximum at the feed injection point and gradually decreased towards the top.

DESCRIPTION OF THE INVENTION

Figure 1:
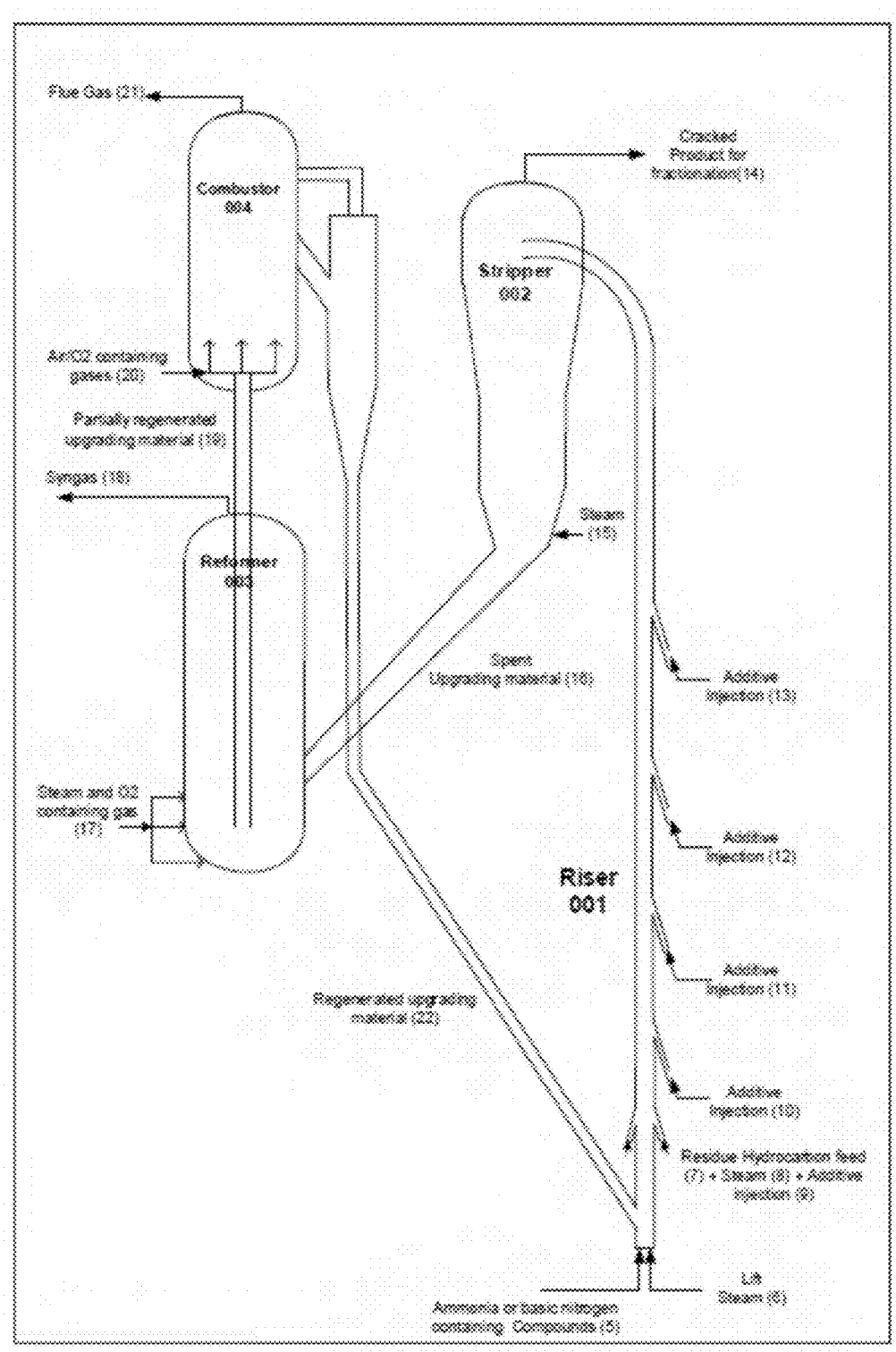
FIG. 1: The schematic diagram of a typical configuration of the said invention disclosure.

While the invention is susceptible to various modifications and/or alternative processes and/or compositions, specific embodiment thereof has been shown by way of example in the drawings and will be described in detail below. It should be understood, however that it is not intended to limit the invention to the particular processes and/or compositions disclosed, but on the contrary, the invention is to cover all modifications, equivalents, and alternative falling within the spirit and the scope of the invention as defined by the appended claims.

The graphs and protocols have been represented where appropriate by conventional representations in the drawings, showing only those specific details that are pertinent to understanding the embodiments of the present invention so as not to obscure the disclosure with details that will be readily apparent to those of ordinary skill in the art having benefit of the description herein.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

The present invention provides a novel process for upgrading a residual heavy hydrocarbon oil feedstock having a significant amount of Conradson Carbon Residue (concarbon), metals, especially vanadium and nickel, asphaltenes, sulfur impurities and nitrogen to lighter more valuable hydrocarbon products.

Figure 3:
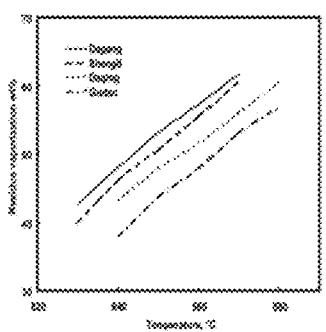
FIG. 3: Effect of atomization steam & partial pressure on residue vaporization (Source: Predicting Vaporization of Residua by UNIFAC Model and Its Implications to RFCC Operations *Energy & Fuels* 2003, 17, 631-636)
Figure 3:
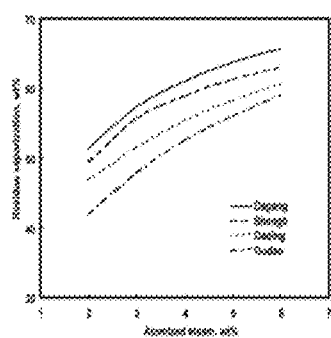
Figure 3:
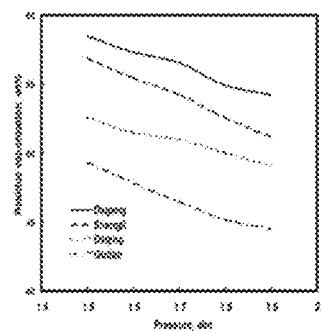

The present invention provides the process of upgrading a residual hydrocarbon oil feedstock/residue hydrocarbon feed [7] by reducing impurities which includes pre-mixing of hydrocarbon stream of feedstock with superheated steam which is then dispersed with the use of a nozzle by applying a high shear force so that it makes tiny droplets while injecting the same into cracking reactor. Steam dispersion in hydrocarbon reduces partial pressure, average molecular weight and boiling point of the hydrocarbon and steam mixture so that the maximum amount of feedstock is vaporized quickly at feed mix zone. Effect of atomization steam & partial pressure on residue vaporization is shown in FIG. 3. The data shows that about 50 wt % of residue is not vaporized at the feed injection point of 550° C. in conventional residue FCC riser. It is also shown in FIG. 3 that increasing atomization steam from 3 wt % to 6 wt % improves vaporization of residue to 65 wt %. Considering this, in addition to feed atomization steam and lift steam, some amount of steam is also injected at downstream of feed injection point to reduce the partial pressure in the cracking reactor. Total Steam to Oil ratio in the present invention is in the range of 0.3 to 1.5 wt/wt in contrast to 0.05 to 0.15 wt/wt as known in conventional FCC process.

Further, during cracking, high molecular weight hydrocarbons having boiling point above feed mix zone temperature are deposited as a semi-solid hydrocarbon deposit or coke on the surface of the upgrading material wherein the coke deposited on the upgrading material consists of high molecular weight molecules that vaporize at 550° C. and above.

Also, said semi-solid hydrocarbon deposits are formed due to improper feed vaporization of the residual hydrocarbon oil feedstock along the length of the riser including feed injection point.

The present invention provides a process for upgrading residue hydrocarbon containing high concentration of concarbon and metals into higher grade oil and includes the cracking system comprising of a vertical transport Riser [001] and a Stripper [002], and two stage regeneration system comprising Reformer [003] and Combustor [004] as shown in FIG. 1. The vertical transport Riser [001] may include a contact system having diluted phase flow section as shown in FIG. 1 or, other cracking reactors like the downflow, moving and inclined flow reactors.

Cracking zone/Riser [001] comprises a means [7] for injecting residue hydrocarbon stream, a means [6] for injecting a fluidizing medium and a means for introducing a regenerated upgrading material/rejuvenated upgrading material [22] (regenerated upgrading material and rejuvenated upgrading material can interchangeably be used in the context of the present invention). The rejuvenated upgrading material coming from the regeneration section is lifted by fluidization medium in vertical transport Riser. Instantaneous feedstock vaporization takes place as soon as it contacts with rejuvenated upgrading material. One of the challenges of residue cracking in a fluidized bed reactor is quick vaporization of the residue feedstock. Residue contains significant amount of multi-ring aromatics. These carbonaceous compounds are principally the high boiling hydrocarbons with boiling point above 550° C. and more particularly, the boiling point of asphaltenes & phorphyrins will be much higher above 800° C.

In fluid catalytic cracking of lighter feeds such as vacuum gas oils, the coke production is typically attributed to four different coking mechanisms, namely, catalytic coke caused by acid site cracking, feed coke resulting from Conradson carbon & high molecular weight hydrocarbons, contaminant coke from adverse reactions caused by metal deposits and strippable coke resulting from entrapped hydrocarbons in the pores. In case of residue feedstocks, high boiling point & high molecular weight hydrocarbons that do not boil at feed mix zone temperature also contribute significantly to coke production in cracking reactor. Therefore, in the processing of these high boiling crude oil fractions, e.g., reduced crudes, bitumen, asphaltenes from extraction process, it is important to provide appropriate conditions at feed mix zone temperature so that the feedstock is vaporized to the extent possible and coke formation due to the un-vaporized high molecular weight hydrocarbons is minimized. The phenomenon of partial vaporization of the heavy fraction of residua in the Resid fluidized bed cracking has been recognized as a key process variable that causes RFCC to differ from FCC operation.

As mentioned above, the rejuvenated upgrading material of the present invention is a basically porous fluidizable micro spherical solid particle belonging to Geldart Group A classification. Typical range of particle size and particle density of upgrading material is about 20-200 microns & 1200-1600 kg/m$^3$. The upgrading material possesses surface area above 80 m$^2$/g. The upgrading material particles mainly consist of the microspheres composed of alumina, silica alumina, silica Magnesia, kaolin clay or a mixture thereof with either acidic or non-acidic properties. These microspheres of non-acidic properties could be prepared using the conventional art of FCC catalyst preparation steps i.e. by preparing the solution of desired chemical composition followed by spray drying and calcinations for synthesizing these materials with very less acidic cracking activity as characterized by MAT activity of less than 10. However, the present invention is not limited to low activity upgrading material alone. Also, the spent or equilibrium catalyst generated from catalytic cracking unit can also be used as upgrading material. High active fresh zeolite catalyst of catalytic cracking unit can also be used as upgrading material after deactivating the same prior to contacting with hydrocarbon feedstock. Ammonia or basic nitrogen containing compound is injected at the bottom of the cracking reactor to neutralize the acidic sites to cause temporary deactivation of the catalyst, while maintaining higher surface area to adsorb feedstock impurities. A means [5] is provided for injection of ammonia or basic nitrogen containing compound or mixture thereof at the bottom of vertical transport Riser [001] in an amount sufficient to reduce the MAT activity below 20. The basic nitrogen compounds used to neutralize the acidic sites of the catalyst belongs to amine group, more particularly alkyl amines such as dialkyl amines.

Total deposited metals on the circulating upgrading material is as high as 1-2 wt % and metal level on the circulating upgrading material is controlled by adjusting the fresh upgrading material addition rate to the system.

As the residue feedstock contacts the regenerated upgrading material in the cracking reactor, feedstock gets vaporized and cracking of hydrocarbons takes place along the length of the vertical transport Riser to yield lighter hydrocarbon products. Residue molecules are generally made of different layers of sheets bonded by heteroatoms such as metals, nitrogen, etc. Metals, nitrogen, sulfur, are generally present as porphyrins, and/or concarbon. These molecules are of very high molecular weight and generally do not vaporize below 550° C. During the cracking, these compounds are deposited as coke on the surface of the upgrading material. Coke thus formed deposits in the pores of upgrading material and therefore blocks the surface area. As the concarbon values of feedstock increases coke production increases. The coke lay down on the upgrading material may vary depending upon the circulation rate of the upgrading material and feed vaporization, which in turn depends on the outlet temperature of the cracking reactor.

Figure 2:
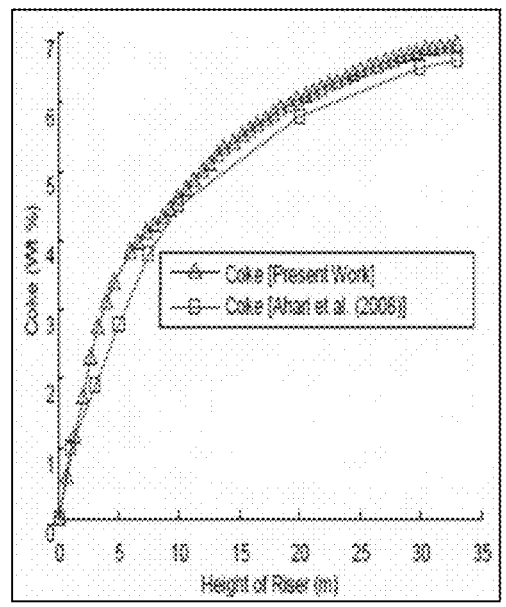
FIG. 2: Graph showing coke deposition along the riser-reactor during the cracking of hydrocarbon feedstock.
Figure 4:
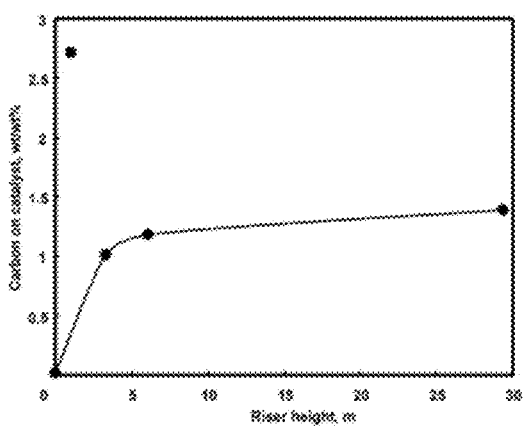
FIG. 4: Carbon content of catalyst along the height of the commercial FCC riser (Source: Predicting Vaporization of Residua by UNIFAC Model and Its Implications to RFCC Operations *Energy & Fuels* 2003, 17, 631-636)

Many researchers have tried to model the coke formation along the length of the riser and found the coke to be continuously increasing along the length of the riser. The work done by Ahari. et. al (FIG. 2) shows that in the transport type of reactors like riser, the cracking of the hydrocarbon feed results in initial spike and then a gradual build-up of coke along the length of the reactor, flattens towards top. As shown in FIG. 2, coke deposition along the initial length of conventional FCC riser (20-30% of total length) above the feed injection point follows exponential trend. FIG. 4 shows the carbon content of catalyst at various riser heights above the feed injection point of a commercial FCC unit processing vacuum gas oil at mix feed injection temperature of 580° C. As shown in the FIG. 4, the carbon content of catalysts at 1 m above the feed injection point was extremely high at 2.71 wt %, and dropped to 1 wt % at 3 m above the feed injection point and then increased slightly and approached an asymptotic value of 1.3 wt % at 30 m of the riser. Very high coke deposition just above the feed injection point and thereafter reduction in coke deposition can be explained by the deposition of un-vaporized (mist or semisolid mass, hereinafter called as semi solid hydrocarbon deposit) heavy fraction of the residue component of feedstock during vaporization and cracking of the un-vaporized heavy fraction above feed injection point respectively.

However, in the case of riser operating with a heavy hydrocarbon feed (concarbon >10 wt %) with inactive or low active upgrading material, the semi-solid hydrocarbon deposit on the upgrading material at feed injection point is much higher than that of conventional catalytic cracking unit. Such un-vaporised hydrocarbons get decomposed along the length of the reactor. After feed injection point, the higher molecular weight hydrocarbon vapours undergoes thermal cracking and the coke lay down after feed injection point is expected to be lower than that of conventional catalytic cracking reactor operating with high active zeolite catalyst.

An oil soluble organo metallic additive is injected in the form of fine droplets into the vertical transport riser [001] at multiple locations [9] to [13] including feed injection point with varying dosing rates for reducing or minimizing coke formation and enhancing distillate production. The organo metallic additive gets decomposed in the cracking reactor and the metal is deposited on the upgrading material, which acts as catalyst toward cracking of the semi-solid hydrocarbon deposit at feed injection point or along the length of the riser. The dosing rate of organo metallic additive is maintained maximum at the feed injection point and gradually decreased towards the top wherein 50-70% of the total organometallic additives is injected in first $\frac{1}{3}^{rd}$ portion of the Riser. Oil soluble organo metallic additive contains a metal, belonging to select alkali or alkaline earth series, which aids in promoting cracking as well as partial regeneration of coke with steam and oxygen containing gases. The select metals are Na & K from alkali group, Mg & Ca from alkaline-earth group & Fe from transition group. The concentration of metal of organo metallic additive in the heavy hydrocarbon feedstock is maintained at least about 20 ppmw.

In case of use of high active catalyst, ammonia or basic nitrogen containing compounds will be injected at the bottom of the riser to neutralize the acid sites of the cracking catalyst so as to minimize the gas make in the riser.

The cracked products and spent upgrading material is separated in a stripper [002] and the spent upgrading material [16] is transferred to Reformer [003] after stripping off the hydrocarbons present in interstitial space and pores of the upgrading material particles. The spent upgrading material constitutes 1 to 5 wt % coke depending on the type of feed & operating conditions and coke is evenly dispersed on the top of the upgrading material in the form of a thin layer. As the coke produced is in nascent form & is dispersed on the high surface area upgrading material in the form of a thin layer, it is highly reactive.

The coke deposited on the upgrading material is partially regenerated by introducing a stream of water vapor along with oxygen containing gases [17] into the Reformer [003] to produce syngas [18]. The metals deposited on the upgrading material during the decomposition of organo metallic additive in the transport fluidized bed riser acts as catalyst for partial regeneration of coke with steam and oxygen containing gases. The partially regenerated upgrading material [19] is transferred to the Combustor [004] for burning the coke with air/oxygen containing gases [20] to produce rejuvenated upgrading material [22] for transferring the same to the Riser [001].

Accordingly the main embodiment of the present invention relates to a process of upgrading a residual hydrocarbon oil feedstock by reducing impurities using upgrading material, the process comprising:
  a) cracking the residual hydrocarbon oil feedstock along the length of a vertical transport Riser with an upgrading material, optionally adding ammonia or a basic nitrogen containing compound at the bottom of the vertical transport Riser;
  b) injecting oil soluble organo-metallic additives in the form of fine droplets at multiple locations in varying doses along the length of the Riser during the cracking of step (a);
  c) separating the cracked products and spent upgrading material in a Stripper and partially regenerating coke of the spent upgrading material so obtained in a Reformer;
  d) burning partially rejuvenated upgrading material from the Reformer in a Combustor; and
  e) circulating regenerated upgrading material from the Combustor to the Riser.

In further embodiment, the doses of the organo-metallic additives is maintained maximum at the feed injection point and gradually decreased towards the top.

In a preferred embodiment, the doses of organometallic additives injected to the first ⅓rd portion of the Riser is in the range of 50-70% of the total organometallic additives and in the ⅔rd portion of the Riser is in the range of 30-50% of total organometallic additives.

In another embodiment, the upgrading material in step (a) is regenerated upgrading material from the Combustor.

In a preferred embodiment, the present invention relates to process of upgrading a residual hydrocarbon oil feedstock by using a regenerated upgrading material having either acidic or non-acidic properties.

In other embodiment, the ammonia or basic nitrogen containing compound is added to the Riser along with the regenerated upgrading material having acidic sites.

In further embodiment, the oil-soluble organo-metallic additives are injected at multiple elevations in the riser.

The organo-metallic additives when contacted with the upgrading material, degrades to eliminate metal from additive which are deposited on coke laden upgrading material having total metals level of 1-2 wt %. In preferred embodiment, the concentration of metal of organo metallic additive in the heavy hydrocarbon feedstock is at least 20 ppmw.

In a preferred embodiment, the organo-metallic additive injected into the Riser deposits metal on the spent upgrading material, wherein the concentration of the metal on the upgrading material is in the range of 1000 to 2000 ppmw.

In preferred embodiment, the oil-soluble organo-metallic additive is selected from alkali, alkaline earth metals or transition group. In most preferred embodiment, the said oil-soluble organo-metallic additives are selected from sodium, potassium, magnesium, calcium and iron.

In other embodiment, the oil-soluble additive added to the riser at multiple elevations is selected from alkali metal group such as sodium and potassium.

In another embodiment, the oil-soluble additive added to the riser at multiple elevations is selected from alkaline-earth metal group such as calcium and magnesium.

In one another embodiment, the oil-soluble additive added to the riser at multiple elevations is selected from transition metal group such as Fe.

The said metal also act as catalyst for cracking of semi-solid hydrocarbon deposit formed due to improper feed vaporization of the residual hydrocarbon feedstock along the length of the riser. Also, the said metal act as catalyst for cracking of semi-solid hydrocarbon deposit which are deposited on the upgrading material itself as coke. This would minimize the coke yield and maximize the distillate yield.

In further embodiment, the upgrading material of step (a) is porous fluidizable micro spherical solid particles belonging to Geldart Group A classification.

In one of the preferred embodiment, the upgrading material possesses surface area above 80 $m^2/g$ and particle size and particle density is 20-200 microns and 1200-1600 $kg/m^3$ respectively. In most preferred embodiment, the surface area of upgrading material is in the range of 100-400 $m^2/g$. It is been observed that when a low surface area inert adsorbent particle such as sand is used, feedstock impurities removal efficiency comes down to the great extent.

In another preferred embodiment, the upgrading material comprises of the microspheres composed of alumina, silica alumina, silica magnesia, kaolin clay or mixture thereof with either acidic or non-acidic properties.

In another embodiment, the upgrading material is selected from the group comprising of spent catalyst or equilibrium catalyst generated from FCC or RFCC unit, fresh zeolite catalyst of FCC or RFCC unit, wherein the said catalyst are temporarily deactivated to neutralise the acidity with basic nitrogen containing compounds or ammonia or mixture thereof before contacting with hydrocarbon feedstock.

In one of the preferred embodiment, the basic nitrogen containing compounds of step (a) are amines selected from amines. In most preferred embodiment, the alkyl amines such as dimethyl amines and diethyl amines are selected.

In one another embodiment, the present invention relates to the process of upgrading residual hydrocarbon oil feedstock selected from the group comprising of bitumen, vacuum residue, vacuum slop, atmospheric residue, asphalts, visbreaker tar, heavy crude oil, etc. and a mixture thereof containing significant amount of impurities, i.e., concarbon, metals such as nickel, vanadium and sodium, asphaltenes, nitrogen and sulphur impurities.

In yet another embodiment, the present invention relates to upgrading of residual hydrocarbon oil feedstock wherein said feedstock is charged to the riser in combination with other diluents such as cycle oil, naphtha, and refinery fuel gas or other suitable vapours or gases such as cracked gases of the present invention to aid with vaporization-atomization of the high boiling oil feed.

In other embodiment, the present invention relates to a process of upgrading a residual hydrocarbon oil feedstock/residue hydrocarbon feed by reducing impurities using upgrading material having non-acidic sites, the process comprising the steps of:
  a) premixing a residual hydrocarbon oil feedstock/residue hydrocarbon feed [7] with superheated steam [8];

b) contacting the residual hydrocarbon oil feedstock of step (a) with a regenerated upgrading material [22] at bottom of a vertical transport Riser [001];
c) injecting oil soluble organo-metallic additives in form of fine droplets at multiple locations [9 to 13] with varying dosing rates in the Riser [001] which contacts with ingredients of step (b);
d) separating cracking products [14] and spent upgrading material [16] so obtained from the Riser [001] in a Stripper [002];
e) transferring the spent upgrading material [16] of step (d) to Reformer [003];
f) introducing steam and oxygen containing gases [17] in the Reformer [003] to partially regenerate coke and to collect syngas [18];
g) transferring the partially regenerated upgrading material [19] from Reformer [003] to Combustor [004];
h) burning off the coke from the partially regenerated upgrading material in Combustor [004] with air/oxygen containing gases [20] to form regenerated upgrading material [22] and flue gas [21]; and
i) recycling the regenerated upgrading material of step (i) to the Riser [001].

In another embodiment, the present invention relates to a process of upgrading a residual hydrocarbon oil feedstock/ residue hydrocarbon feed by reducing impurities using upgrading material having acidic sites, the process comprising the steps of:
a) contacting the residual hydrocarbon oil feedstock of step (a) with a regenerated upgrading material [22] at bottom of a vertical transport Riser [001] wherein the active sites of regenerated upgrading material is deactivated by injecting ammonia or a basic nitrogen containing compounds;
b) injecting oil soluble organo-metallic additives in form of fine droplets at multiple locations [9 to 13] with varying dosing rates in the Riser [001] which contacts with ingredients of step (b);
c) separating cracking products [14] and spent upgrading material [16] so obtained from the Riser [001] in a Stripper [002];
d) transferring the spent upgrading material [16] of step (d) to Reformer [003];
e) introducing steam and oxygen containing gases [17] in the Reformer [003] to partially regenerate coke and to collect syngas [18];
f) transferring the partially regenerated upgrading material [19] from Reformer to Combustor [004];
g) burning off the coke from the partially regenerated upgrading material in Combustor [004] with air/oxygen containing gases [20] to form regenerated upgrading material [22] and flue gas [21]; and
h) recycling the regenerated upgrading material of step (i) to the Riser [001].

In a preferred embodiment, the said coke laden upgrading material consist of 1 to 5 wt % of coke evenly dispersed on the top of the upgrading material in form of thin layer, wherein said coke is in nascent form and is highly reactive towards the reforming to syngas and combustion.

The invention claimed is:
1. A process of upgrading a residual hydrocarbon oil feedstock by reducing impurities using upgrading material, the process comprising:
a) cracking the residual hydrocarbon oil feedstock along the length of a vertical transport Riser with an upgrading material, optionally adding ammonia or a basic nitrogen containing compound at the bottom of the vertical transport Riser;
b) injecting oil soluble organo-metallic additives in the form of fine droplets at multiple locations in varying doses along the length of the Riser during the cracking of step (a);
c) separating the cracked products and spent upgrading material in a Stripper and partially regenerating coke of the spent upgrading material so obtained in a Reformer;
d) burning partially rejuvenated upgrading material from the Reformer in a Combustor; and
e) circulating regenerated upgrading material from the Combustor to the Riser.

2. The process as claimed in claim 1, wherein the residual hydrocarbon oil feedstock is selected from the group comprising of vacuum residue, vacuum slop, bitumen, asphalt, visbreaker tar, heavy crude oil and mixture thereof having a significant amount of Conradson Carbon Residue, metals, asphaltenes, sulphur impurities and nitrogen.

3. The process as claimed in claim 1, wherein the upgrading material of step (a) is a porous fluidizable micro spherical solid particles belonging to Geldart Group A classification.

4. The process as claimed in claim 1, wherein the upgrading material of step (a) have a surface area above 80 $m^2/g$ and particle size and particle density is 20-200 microns and 1200-1600 $kg/m^3$ respectively and comprises of the microspheres composed of alumina, silica alumina, silica magnesia, kaolin clay or mixture thereof having lower MAT activity.

5. The process as claimed in claim 1, wherein the upgrading material is selected from the group comprising of spent catalyst or equilibrium catalyst generated from FCC or RFCC unit, fresh zeolite catalyst of FCC or RFCC unit, wherein the said catalyst are temporarily deactivated to neutralise the acidity, with basic nitrogen containing compounds or ammonia or mixture thereof, before contacting with hydrocarbon feedstock.

6. The process as claimed in claim 1, wherein the doses of the organo-metallic additives is maintained maximum at the feed injection point and gradually decreased towards the top.

7. The process as claimed in claim 1, wherein the oil soluble organo-metallic additives are selected from alkali, alkali-earth metals or transition group.

8. The process as claimed in claim 7, wherein alkali metal are Na and K; alkali-earth metals are Mg and Ca; and transition group is Fe.

9. The process as claimed in claim 1, wherein the organo-metallic additive is injected into the Riser to deposit metal on the spent upgrading material wherein the concentration of the metal on the upgrading material is in the range of 1000 to 2000 ppmw.

10. The process as claimed in claim 1, wherein the basic nitrogen containing compounds of step (a) belong to amines selected from alkylamines.

* * * * *

UNITED STATES PATENT AND TRADEMARK OFFICE
CERTIFICATE OF CORRECTION

PATENT NO.        : 9,783,744 B2
APPLICATION NO.   : 15/240191
DATED             : October 10, 2017
INVENTOR(S)       : Bhanuprasad et al.

It is certified that error appears in the above-identified patent and that said Letters Patent is hereby corrected as shown below:

On the Title Page

Item (30) Foreign Application Priority Data: change "4249/15" to --4249/MUM/2015--

Signed and Sealed this
Ninth Day of January, 2018

Joseph Matal
*Performing the Functions and Duties of the*
*Under Secretary of Commerce for Intellectual Property and*
*Director of the United States Patent and Trademark Office*